March 5, 1935.  M. W. McARDLE  1,993,177
WAFFLE IRON
Filed Oct. 2, 1930
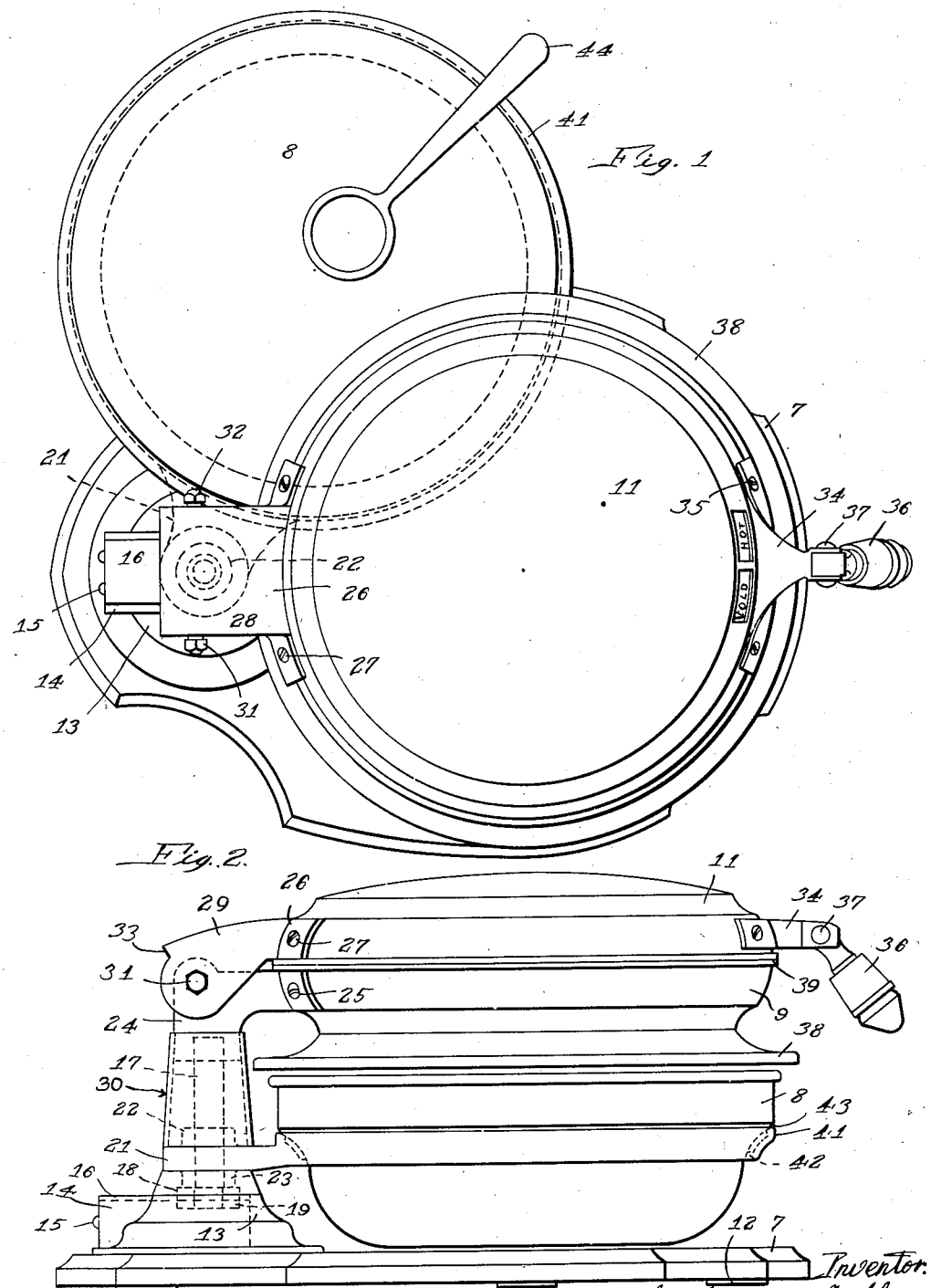

Patented Mar. 5, 1935

1,993,177

UNITED STATES PATENT OFFICE 1,993,177

WAFFLE IRON

Michael W. McArdle, Chicago, Ill.

Application October 2, 1930, Serial No. 485,872

3 Claims. (Cl. 53—10)

This invention relates to griddles and has particular reference to a griddle having combined means for cooking a food product and for holding a quantity of batter, adapted to be employed in preparing the food product.

Griddle cakes, waffles, and the like, are commonly prepared at the breakfast table during the morning meal by means of electrically heated griddles adapted to be placed directly on the dining table. In the past these have generally consisted of a griddle in which the food product is cooked, a separate container such as a pitcher, being employed to hold the batter. Such an arrangement is unsightly and leads to numerous difficulties.

I have, therefore, aimed to provide a combined griddle and container wherein the container is supported beneath the griddle to move between a closed position directly below the griddle and an open position in which batter may be transferred from the container to the griddle.

Another object of the invention is the provision of a combined griddle and container which may be manufactured at a relatively small cost.

Other objects and attendant advantages will become apparent to those skilled in the art from the following description and the accompanying drawing in which—

Figure 1 is a top view of a device embodying my invention;

Fig. 2 is a side elevation of the device shown in Fig. 1, showing, in dotted lines, the manner in which the cooking elements and the container are supported upon the tray.

The invention contemplates the provision of at least one electrically heated cooking element upon which a food object may be cooked and a container adapted to hold a quantity of batter to be employed upon the cooking element. Where food products such as griddle cakes are to be made it is necessary to provide but a single cooking element while the cooking of waffles and the like will require an upper and a lower cooking element. The container and grids are supported for relative movement between a vertically concentric position in which position the interior of the container is concealed and substantially closed and an open position in which the container is at least partially exposed so that batter may be transferred therefrom to the cooking element.

Referring to Figs. 1 and 2, the form shown therein consists of a base or tray designated generally by the numeral 7, a bowl designated generally by the numeral 8, and lower and upper electrically heated cooking elements designated by the numerals 9 and 11. Feet 12 may be secured to the bottom of the tray 7 if desired, to cushion the tray upon a table or other means of support. A standard 13 is secured to the tray by any suitable or desired means and is provided with a socket 14 having electrical terminals 15 adapted to receive a conventional plug for delivering electrical energy to the device. The upper side 16 of the socket 14 extends through the standard 13 and is provided with an opening adapted to receive a pipe 17. The pipe 17 is fixedly secured to the side 16 by means of nuts 18 and 19 secured to the pipe 17 on opposite sides of the side 16. A bracket 21 having bosses 22 and 23 on opposite sides thereof is provided with an opening to receive the pipe 17 passing through the bosses, the latter serving to provide a long bearing for the bracket 21 upon the pipe 17. The bracket 21 is thus rotatably supported upon the pipe 17 with the lower boss 23 resting against the upper side of the nut 18. An arm 24 is fixedly secured to the upper end of the pipe 17 and is secured to the lower cooking element 9 by means of screws 25 or otherwise as desired. Thus the pipe 17 is fixedly supported within the standard 13 and serves to rotatably support the bracket 21 and fixedly support the arm 24 to which the lower cooking element 9 is secured. A hinge element 26 is attached to the upper cooking element 11 by means of screws 27 and is provided with a flat upper portion 28 and spaced side portions 29. Stud bolts 31 and 32 pass through the side portions 29 of the hinge member 26 and into the arm 24 to rotatably support the hinge member 26 and the upper cooking element 11 thereon. A shoulder 33 on the hinge member 26 is adapted to come in contact with the arm 24 when the upper cooking element 11 is brought to its open position to hold the element in the desired position. If desired a tube 30 may be secured to the arm 24, around the pipe 17 to conceal the latter.

A finger 34 is secured to the forward edge of the upper cooking element 11 by means of screws 35 and serves to support a handle 36 which is pivotally secured thereto by means of a pin 37. The handle 36 serves to permit the operator to move the cooking element 11 between the closed position shown in Fig. 2 and the open position.

A rim 38 is fixedly secured to the bottom of the lower cooking element 9 and extends outward around the cooking element beneath the periphery 39 thereof. The function of the rim 38 is twofold. It serves to catch the drip of material from the periphery 39 of the cooking elements from which batter often drips when forced out from beneath the upper and lower cooking elements. It also serves to provide a concealing rim for the interior of the bowl 8.

The bracket 21 is provided with a ring 41 extending horizontally outward between the tray 7 and the cooking element 9. The inner surface 42 of the ring 41 is inclined inward as shown in Fig. 2, adapted to cooperate with the curved side 43 of the bowl 8 to support the bowl within the ring, and yet permit it to be lifted upward out of the ring so that batter may be prepared therein or the bowl may be washed.

In operating the device the bowl 8 is removed from the ring 41 and the desired batter prepared therein. The spoon 44 is inserted in the bowl and the bowl is replaced within the ring 41. During these operations the bowl will have been rotated to the position shown in Fig. 1 in which position it may be removed or replaced within the ring. The bowl is then rotated to a position directly beneath the cooking element 9, in which position the interior of the bowl is concealed. Suitable electric connections are made at the socket 14 and the cooking elements 9 and 11 are permitted to heat. When they have reached a suitable operating temperature the bowl 8 is rotated to the position shown in Fig. 1 and batter is transferred from the bowl 8 to the lower cooking element 9, the upper cooking element 11 having been rotated to its open position. The capacity of the spoon 44 is such that it holds just sufficient batter to form a single waffle. When the cooking elements have been thus charged with batter the spoon is replaced in the bowl 8 and the latter rotated to the closed position shown in Fig. 2 in which position the interior thereof will be concealed.

The advantages of my improved construction will doubtless have become apparent to those skilled in the art. I have provided a griddle wherein the cooking elements and the batter container are included in a unitary structure. I have provided a device wherein the unsightly interior of the batter container is normally concealed from view. Means are provided for transporting the container from a closed concealed position to an open, at least partially exposed position, from which batter may be transferred from the container to the cooking elements. The container is so supported that it may be easily removed for the purpose of making up the batter therein or for the purpose of cleaning the same.

While I have thus described and illustrated a specific embodiment of my invention, I am aware that numerous alterations and changes may be made therein without materially departing from the spirit of the invention and I do not wish to be limited except as required by the prior art and the scope of the appended claims in which—

I claim:

1. A waffle griddle comprising, in combination, a tray, upper and lower cooking grids supported on said tray and spaced therefrom, the upper grid being rotatable on a horizontal axis to open and close the grids a bowl for holding batter to be used on said cooking elements of a size to substantially fill the space between the elements and the tray, bowl supporting means axially positioned with respect to said cooking elements between said tray and said elements adapted to receive and support said bowl, and pivotal means for supporting said means whereby said bowl may be moved between a closed position beneath said elements and an open position for transfer of batter to the lower grid when said grids occupy the open position.

2. A waffle griddle comprising, in combination, a tray, a standard on said tray, upper and lower cooking grids on said standard overhanging and spaced from said tray, a bowl for holding batter to be used on said cooking elements of a size to substantially fill the space between the grid and the tray, a ring adapted to receive said bowl, and means for pivotally supporting said ring on said standard between said cooking elements and said tray to support said bowl for rotation between a closed position beneath said cooking elements and an open position.

3. A portable electric griddle comprising a tray having an upright, a pair of waffle grids supported upon said upright in superimposed spaced relationship with said tray, a batter bowl for holding batter to be used upon said grids of a size to substantially fill the space between the grids and the tray, and a bowl supporting member rotatably positioned upon said vertical upright between the tray and the grids arranged to support said bowl for movement between a closed normal position directly between said tray and said grids and an open position offset therefrom for the transfer of batter to said grids.

MICHAEL W. McARDLE.